United States Patent [19]

Hayashi et al.

[11] 4,396,992
[45] Aug. 2, 1983

[54] WORD PROCESSOR

[75] Inventors: Yoshio Hayashi, Zushishi; Makoto Ibuka, Tokyo, both of Japan

[73] Assignee: Sony Corporation, Tokyo, Japan

[21] Appl. No.: 229,989

[22] Filed: Jan. 30, 1981

[30] Foreign Application Priority Data

Apr. 8, 1980 [JP] Japan ................................ 55-46359

[51] Int. Cl.³ .............................................. B41J 5/08
[52] U.S. Cl. ....................................... 364/900; 400/98
[58] Field of Search ...................... 364/900, 200, 709; 400/98, 99, 472, 482

[56] References Cited

U.S. PATENT DOCUMENTS 3,289,804 12/1966 Schaefer ................................ 400/98
3,892,958 7/1975 Tung .................................... 364/709
4,334,792 6/1982 Joest et al. ......................... 364/900 X

OTHER PUBLICATIONS

Arellano et al., "Word Generation System for Typist", IBM Tech. Disclosure Bulletin, vol. 17, No. 8, Jan. 1975, pp. 2422-2423.
Chang, "Typewriter Keyboard Addition Based on Word Input Concept", IBM Tech. Disclosure Bulletin, vol. 22, No. 6, Nov. 1979, pp. 2530-2531.

Primary Examiner—David H. Malzahn
Attorney, Agent, or Firm—Hill, Van Santen, Steadman, Chiara & Simpson

[57] ABSTRACT

Keyboard apparatus, for example for a word processor comprises a standard alpha-numeric keyboard having an additional special key. On striking the spacer bar followed by a key corresponding to a letter and followed by the special key, the apparatus operates to print or to store for subsequent printing a predetermined complete word allocated to that particular letter. The words are predetermined according to their frequency of occurrence. For example, "v" may correspond to "very". If the striking of the letter key has not been immediately preceded by striking of the spacer bar, then the apparatus operates to print or to store for subsequent printing a predetermined word ending allocated to that particular letter. For example, "m" may correspond to "ment". The apparatus can also operate to incorporate capital letters where appropriate and to print or store for subsequent printing complete words in response to the non-alphabetic keys.

6 Claims, 3 Drawing Figures

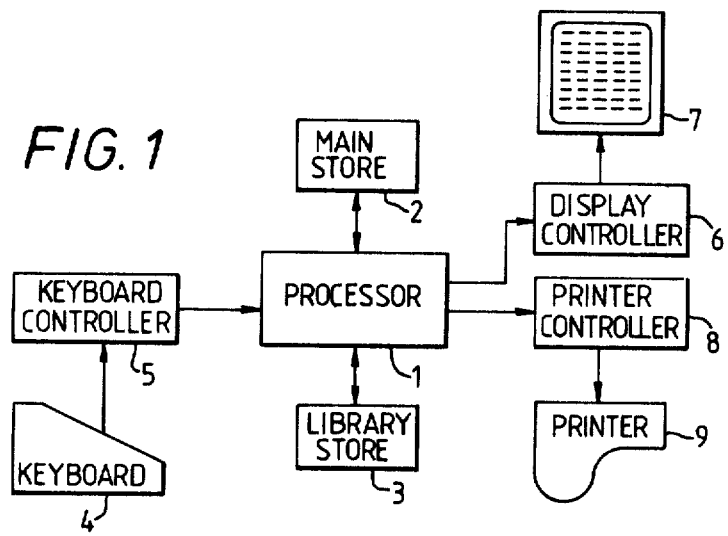
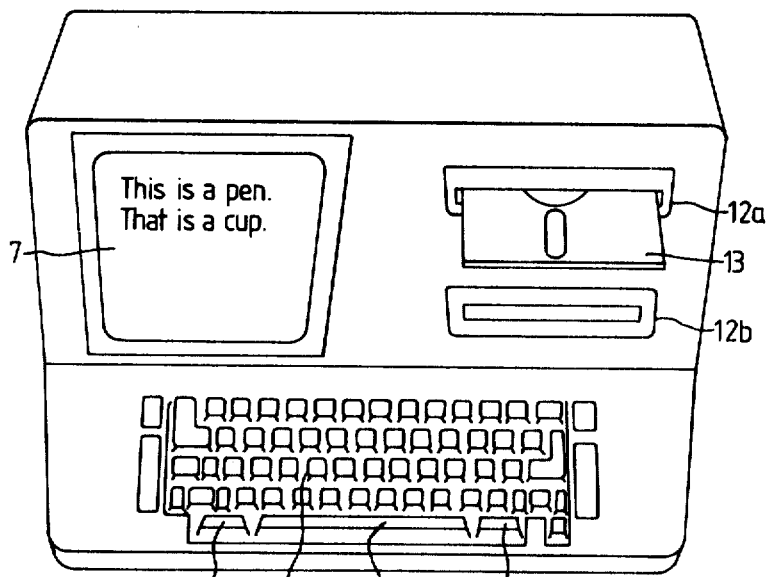

WORD PROCESSOR

BACKGROUND OF THE INVENTION

1. Field of the Invention

This invention relates to keyboard apparatus. Such apparatus may, for example form part of an electric typewriter, a word processor, a telex machine, or some other equipment incorporating an alpha-numeric keyboard.

2. Description of the Prior Art

Alpha-numeric keyboards are of course extremely well-known, and the operation of such keyboards is such that for each alphabetic character or numeral or other non-alphabetic symbol to be reproduced, an individual key has to be struck.

SUMMARY OF THE INVENTION

One object of the present invention is to provide keyboard apparatus in which in certain cases the number of alphabetic characters reproduced exceeds the number of keys struck.

Another object of the present invention is to provide a keyboard apparatus in which the striking of a key corresponding to a letter followed by the striking of a special key causes a whole word corresponding to that letter to be reproduced.

Another object of the present invention is to provide a keyboard apparatus in which the striking of a key corresponding to a letter followed by the striking of a special key causes a word ending corresponding to that letter to be reproduced.

Another object of the present invention is to provide a keyboard apparatus which can be operated at higher speed by reducing the number of keys which have to be struck to produce a given amount of typescript.

According to the present invention there is provided keyboard apparatus comprising:

a keyboard with keys corresponding to alpha-numeric characters, a spacer key, and an additional key;

a processor for processing and controlling signals from said keyboard in the form of code signals;

a first memory for storing said code signals; and a second memory for storing code signals corresponding to words which are respectively assigned to at least some of said characters;

wherein striking of said spacer key followed by a said alpha-numeric key followed by said additional key causes said processor to be fed with the code signal corresponding to the selected letter from said keyboard and to read-out a further code signal from said second memory and corresponding to the word assigned to said letter, and also to write-in the code signal corresponding to the word so read-out and a code signal corresponding to a space into said first memory.

According to the present invention there is also provided keyboard apparatus comprising:

a keyboard with keys corresponding to alpha-numeric characters, a spacer key, and an additional key;

a processor for processing and controlling signals from said keyboard in the form of code signals;

a first memory for storing said code signals; and a second memory for storing code signals corresponding to complete words and word endings which are respectively assigned to at least some of said characters;

wherein striking of said spacer key followed by a said alpha-numeric key followed by said additional key causes said processor to be fed with the code signal corresponding to the selected letter from said keyboard and to read-out a further code signal from said second memory and corresponding to the word assigned to said letter, and also to write-in the code signal corresponding to the word so read-out and a code signal corresponding to a space into said first memory; and wherein striking of a said alpha-numeric key followed by said additional key causes said processor to be fed with the code signal corresponding to the selected letter from said keyboard and to read-out a further code signal from said second memory and corresponding to the word ending assigned to said letter, and also to write-in the code signal corresponding to the word ending so read-out and a code signal corresponding to a space into said first memory.

The above, and other objects, features and advantages of this invention will be apparent from the following detailed description of illustrative embodiments which is to be read in connection with the accompanying drawings.

BRIEF DESCRIPTION OF THE DRAWINGS

FIG. 1 shows in block form a word processor incorporating an embodiment of the invention;

FIG. 2 is a simplified perspective view of the word processor; and

DESCRIPTION OF THE PREFERRED EMBODIMENTS

Figure 3:
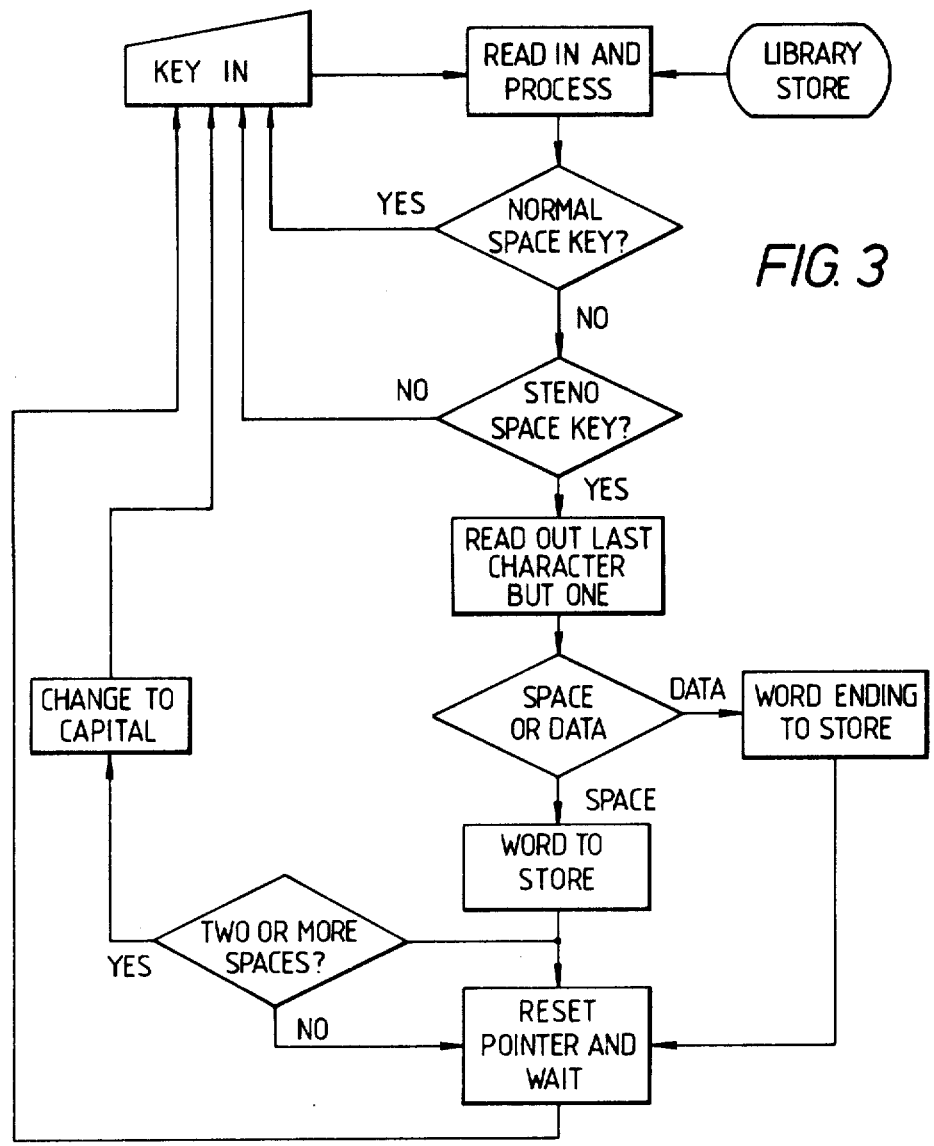
FIG. 3 is a flow chart which will be used to describe the operation of an embodiment.

The invention will be described as applied to a word processor which is shown in block form in FIG. 1, to which reference is now made. The word processor comprises a main processor 1, which may be a microprocessor, and to which are coupled a main store 2 and a library store 3. An alpha-numeric keyboard 4, generally of standard form, is coupled by way of a keyboard controller 5 to the processor 1.

Outputs from the processor 1 are coupled to a display controller 6 which controls a video display unit 7, and to a printer controller 8 which controls a printer 9.

As seen in FIG. 2, the keyboard 4 is of generally standard form and layout, but disposed to left and right respectively of the spacer key 10 are two additional keys 11a and 11b, which throughout this description will be referred to steno space keys 11a and 11b. Strictly it is only necessary to provide a single steno space key 11a or 11b, but for convenience of operation it is better to provide two as shown.

FIG. 2 shows the video display unit 7 and also slots 12a and 12b for respectively receiving magnetic discs 13 of the usual form, on which the work handled by the word processor is stored.

In operation a signal from the keyboard 4 is supplied to the keyboard controller 5 where the signal is converted into a code signal, for example using the 7-bit or 8-bit American Standard Code for Information Interchange (ASCII) code, the code signal produced corresponding to the key that has been struck. The code signal is supplied to the processor 1 for processing according to a program described below. The main store 2 is a random access memory (RAM) while the library store is a RAM or erasable and programmable read-only memory (EPROM). The code signals resulting from operation of the keys are written into the main store 2 in sequence.

The code signals may also be supplied from the processor 1 to the display controller 2 so that the corresponding characters can be displayed on the video display unit 7 which comprises a cathode ray tube and may have capacity to display, for example a full page of A4 size. Making use of the video display unit 7 the operator can check the material typed and make corrections in the usual way.

When a hard copy is required, the code signals stored in the main store 2 are sequentially read out and fed to the printer controller 8 which controls the printer 9 to produce the required hard copy.

In the library store 3 are stored code signals corresponding to words which are assigned to each of the alphabetical characters and to word endings which are assigned to at least some of the alphabetical characters. One example of the character assignment is shown by the following table.

| Character | Word | Word Ending |
|---|---|---|
| a | are | able |
| b | but | |
| c | can | cial |
| d | did | |
| e | even | ent |
| f | for | ful |
| g | get | ght |
| h | his | |
| i | in | ing |
| j | just | |
| k | know | |
| l | like | ly |
| m | more | ment |
| n | not | ness |
| o | out | ous |
| p | people | |
| q | question | |
| r | rather | rent |
| s | she | self |
| t | that | tion |
| u | use | ugh |
| v | very | |
| w | was | ween |
| x | experience | |
| y | you | |
| z | the | |

The assignment is done firstly on the basis of the language for which the keyboard is to be used, and secondly on the basis of the frequency of occurrence of words for which the keyboard apparatus will be used. The above table is suitable for ordinary American English and the assignments have been made on the basis of H Kucera's "Computational analysis of present day use of American English" published in 1967 by Brown University. For the English language some modifications might well be desirable, and for other languages, of course quite substantial modification would be necessary. Moreover, it is to be noted that as different schemes of assignment merely require different information to be stored in the library store 3 and make no difference to the basic operation of the system, specialised assignments can be devised for use with keyboard apparatus which are to be used for example in a specialised technical field. Thus a specialised assignment might, for example, be devised for chemical or pharmaceutical use. Moreover, in a case where particularly long words are of relatively frequent occurrence in a certain field, the assignment of these words to characters rather than commoner but shorter words may result in a greater overall reduction in the number of key strokes necessary.

So far as the above table is concerned, it will be noted that the assigned words are all of common occurrence in American English and in general consist of at least three letters, the exception being the assignment of "in" to "i". Where there is a blank space in the table, no assignment has been made, because no particularly suitable word ending is available. Moreover, since the number of words or word endings starting with "z" is relatively small, the word "the" has been assigned to "z", from consideration of the phonetic similarity.

Assuming that the assignments set out in the above table have been made, the following examples illustrate the operation. If the key "z" is struck followed by one or other of the steno space keys 11a or 11b the code signals corresponding to "the ⌴" (⌴ means a space) are automatically written in the main store 2. Normally four key strokes would have been necessary for this, but in the present case it will be seen that this is reduced to two. Of course if merely the character "z" was required, then neither of the steno space keys 11a or 11b would have been struck. If the keys "s", "t", "a", "t" followed by one or other of the steno space keys 11a or 11b are struck, then the code signals corresponding to "station ⌴" are entered. In this case the usual eight key strokes are reduced to five.

The processor 1 distinguishes between the requirement for the word assigned to a character and the word ending assigned to the character in dependence on whether the character entered before the steno space key 11a or 11b was struck was itself preceded by another character or by a space. In the former case it must be the word ending which is required and in the latter case it must be the complete word. As there is not a word ending corresponding to every character, it is possible for the operator to make a mistake in calling for a word ending, and in that case a convenient method of indicating this is by way of an audible alarm such as a buzzer. Alternatively, an alarm lamp associated with the keyboard 4 may be illuminated.

The program by which the processor 1 achieves the above operations will now be described in more detail with reference to the flow chart shown in FIG. 3. When a key of the keyboard 4 is struck, a key input is transmitted from the keyboard controller 5 to the processor 1 and thence to the main store 2 to be written therein. When the spacer key 10 or a steno space 11a or 11b is struck, a decision is made as to which key it is. In the case that it is the spacer key 10, the next key input will be expected. However, when it is the steno space key 11a or 11b, the code word corresponding to the key input which was the second input back from the steno space key input, that is the preceding key input but one, and which is memorised in the main store 2 is read out. In other words, a pointer is returned by two characters with respect to the address in the main store 2. A decision is then made whether the preceding key input but one corresponded to a space or not. If the decision is that this was a space, then this implies that the character entered prior to the striking of the steno space key 11a or 11b was the first letter of a word, while in the other case the decision is that the letter is an intermediate letter in the word.

The read-out address for the library store 3 has basically been determined according to the character corresponding to the key struck prior to the steno space key 11a or 11b, and a code signal corresponding to a word or a word ending is selected by the decision as to whether the preceding key but one corresponded to a space or not. Thus, when the preceding key but one corresponds to a space, the code signal corresponding to the assigned word is read from the library store 3 and written in the main store 2 together with a code signal corresponding to a space at the next address. When the preceding key input but one does not correspond to a space, the code signal corresponding to the assigned word ending is read out from the library store 3 and written in the main store 2 again followed by a code signal corresponding to a space in the next address. As soon as the code signals corresponding to the assigned word plus space, or assigned word ending plus space have been written in the main store 2, the pointer is returned to the address where the next key input is to be written.

In the above description it has been assumed that only code signals corresponding to words and word endings, plus associated spaces, are stored as a result of operation of the steno space key 11a or 11b. However, it will be clear that various extensions are possible. For example, a system may operate according to the following rules (some but not all of which overlap with the system described above):

(a) A word or word ending is assigned to each keyboard character. Such assignments are not affected by use of a shift key.
(b) Assigned words and word endings are stored by operation of a steno space key.
(c) A word consisting of only two letters is preferably not assigned.
(d) The striking of a key corresponding to a numeral or a specific symbol followed by striking of a steno space key results in conversion of the numeral or symbol into a word. For example, 4 becomes four, $ becomes dollar, and % becomes percent.
(e) If the steno space key is struck after the key "p", then if this occurs after a verb input, this verb is transformed into its past form, and if it occurs after a noun, the noun is transformed into its plural form. Verbs and nouns having high usage are stored in the library store 3 to enable this to be done, but it is to be noted that words of the same spelling which double both as verbs and nouns must not be included. For example, the word "lead" may be a verb or a noun and should not be included.
(f) If an assigned word is stored as a result of operation of the steno space key, and that word is at the beginning of a sentence, which fact is determined by ascertaining if there are two or more spaces preceding the word, the first letter of the word is stored as a capital letter, thus avoiding the need to operate the shift key.
(g) A period is entered following the last word of a sentence and is always placed at a position close to the last word. At the same time, the period is automatically followed by two or more spaces. For example, when the key "t", followed by a steno space key 11a or 11b, followed by the key for a period are struck, "tion.⌴⌴" is entered.

The operation of a system operating according to these rules will perhaps best be understood by further consideration of FIG. 3 and of the following examples:

EXAMPLE 1 condit⌴
condition⌴(in these examples⌴means a space)

EXAMPLE 2

He knows t⌴boy.
He knows that⌴boy.

EXAMPLE 3

This is a pen. t⌴is a cup.
This is a pen. That⌴is a cup.

EXAMPLE 4 (verb)

bringp⌴
brought-

EXAMPLE 5 (noun)

childp⌴
children⌴

EXAMPLE 6 ("p" but not verb or noun)

p⌴
people⌴

EXAMPLE 7

4⌴
four⌴

EXAMPLE 8

$⌴
dollar⌴

EXAMPLE 9

%⌴
percent⌴

EXAMPLE 10 (period and one space)

This is a pen.⌴t⌴is a pen.
This is a pen. That⌴is a pen.

EXAMPLE 11 (two or more spaces)

This is a pen.⌴t⌴is a cup.
This is a pen. that⌴is a cup.

EXAMPLE 12 (steno, period, space, character, steno)

It is in good condit⌴.⌴s is impressed.
It is in good condition. She is impressed.

As a further alternative, the system can be modified to operate as a consonant input system. This is based on the fact that abreviations formed by omitting most of the vowels and possibly some of the consonants from words still have a strong correlation to the words. For example, hv corresponds to have
yr corresponds to your
wi corresponds to will
bf corresponds to before
ol corresponds to only
gvm corresponds to government
wlcm corresponds to welcome
dvlmp corresponds to development Also, having regard to the phonetic similarity between "z" and "the":

zm corresponds to them
zy corresponds to they

Thus, by the storage of selected abbreviations together with the corresponding words in the library store 3, the words can be entered merely by striking the keys corresponding to the letters of the abbreviation followed by the steno space key 11a or 11b.

It will be apparent from the above description that the number of keys which have to be struck and hence the labor involved in entering a particular piece of work will be substantially reduced by the use of the above system. Moreover, although described as applied to a word processer, the invention can also be applied to other keyboard apparatus such as electric typewriters and telex machines.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A word processor comprising a keyboard with alpha-numeric keys corresponding to alpha-numeric characters, a spacer key, and an additional key; a keyboard controller connected to said keyboard; a processor connected to said keyboard controller for processing and controlling signals from said keyboard in the form of code signals; a first memory for storing said code signals connected to said processor, a second memory connected to said processor for storing code signals corresponding to words which are respectively assigned to said alpha-numeric keys; means in said processor for recognizing the sequence of striking said spacer key followed by striking an alpha-numeric key followed by striking said additional key which sequence causes said processor to read-out a code signal from said second memory corresponding to the word assigned to said alpha-numeric key, and to write-in said first memory the code signal corresponding to the word and a space.

2. A word processor according to claim 1 wherein said first memory is a random access memory.

3. A word processor according to claim 1 wherein said second memory is a random access memory.

4. A word processor according to claim 1 wherein said second memory is an erasable and programmable read-only memory.

5. A word processor according to claim 1 including means in said processor for recognizing the sequence of striking the spacer key, followed by again striking the spacer key, then striking an alpha-numeric key and then striking said additional key and said word corresponding to said alpha-numeric key is stored in said first memory with the first letter being a capital.

6. A word processor comprising a keyboard with alpha-numeric keys corresponding to alpha-numeric characters, a spacer key, and an additional key; a keyboard controller connected to said keyboard; a processor connected to said keyboard controller for processing and controlling signals from said keyboard in the form of code signals; a first memory for storing said code signals connected to said processor; a second memory connected to said processor for storing code signals corresponding to word endings which are respectively assigned to said alpha-numeric keys; means in said processor for recognizing the sequence of striking an alpha-numeric key followed by striking another alpha-numeric key followed by striking said additional key which sequence causes said processor to read-out a code corresponding to a word ending from said second memory corresponding to said second struck alpha-numeric key and to write-in said first memory the code corresponding to said word ending and a space.

* * * * *